(12) United States Patent
Bayat

(10) Patent No.: US 11,914,447 B1
(45) Date of Patent: Feb. 27, 2024

(54) APPROXIMATE COMPUTATION IN DIGITAL SYSTEMS USING BIT PARTITIONING

(71) Applicant: MENTIUM TECHNOLOGIES INC., Santa Barbara, CA (US)

(72) Inventor: Farnood Merrikh Bayat, Goleta, CA (US)

(73) Assignee: MENTIUM TECHNOLOGIES INC., Santa Barbara, CA (US)

( * ) Notice: Subject to any disclaimer, the term of this patent is extended or adjusted under 35 U.S.C. 154(b) by 701 days.

(21) Appl. No.: 17/100,684

(22) Filed: Nov. 20, 2020

Related U.S. Application Data

(60) Provisional application No. 62/938,207, filed on Nov. 20, 2019, provisional application No. 62/938,217, filed on Nov. 20, 2019, provisional application No. 62/938,214, filed on Nov. 20, 2019, provisional application No. 62/938,211, filed on Nov. 20, 2019.

(51) Int. Cl.
| | |
|---|---|
| *G06F 1/32* | (2019.01) |
| *G06F 1/3234* | (2019.01) |
| *G06F 9/50* | (2006.01) |
| *G06F 5/01* | (2006.01) |
| *G06F 7/523* | (2006.01) |
| *G06F 7/50* | (2006.01) |
| *G06F 7/544* | (2006.01) |

(52) U.S. Cl.
CPC .............. *G06F 1/3243* (2013.01); *G06F 5/01* (2013.01); *G06F 7/50* (2013.01); *G06F 7/523* (2013.01); *G06F 7/5443* (2013.01); *G06F 9/5027* (2013.01)

(58) Field of Classification Search
CPC ................. G06F 1/32; G06F 9/44; G06F 1/28
See application file for complete search history.

(56) References Cited

U.S. PATENT DOCUMENTS

| | | | |
|---|---|---|---|
| 2004/0148321 A1 | 7/2004 | Guevorkian et al. | |
| 2011/0134137 A1* | 6/2011 | Lee ........................ | G06T 11/001 345/582 |
| 2018/0225116 A1 | 8/2018 | Henry et al. | |
| 2018/0321938 A1* | 11/2018 | Boswell ................. | G06F 9/3012 |
| 2019/0347553 A1* | 11/2019 | Lo ........................... | H03M 7/24 |

OTHER PUBLICATIONS

International Search Report and Written Opinion issued in corresponding application No. PCT/US2020/061685, dated Feb. 25, 2021.

* cited by examiner

*Primary Examiner* — Keshab R Pandey
(74) *Attorney, Agent, or Firm* — Maschoff Brennan

(57) ABSTRACT

A computing methodology in digital systems for performing computationally expensive operations while lowering the required computing resources, the power consumed to accomplish the computation, and maximizing the system throughput. Intermediate computations within the operation may be analyzed and those that have low gain values are identified and may be either removed from the computation or calculated with lower precision.

17 Claims, 3 Drawing Sheets

APPROXIMATE COMPUTATION IN DIGITAL SYSTEMS USING BIT PARTITIONING

CROSS-REFERENCE TO A RELATED APPLICATION

This patent application claims the benefit of and priority to U.S. Provisional App. No. 62/938,211, U.S. Provisional App. No. 62/938,207, U.S. Provisional App. No. 62/938,214, and U.S. Provisional App. No. 62/938,217, all filed Nov. 20, 2019, which are incorporated by reference in the present disclosure in their entireties for all that they disclose.

BACKGROUND

In most digital computing systems or hardware, data is represented with limited precision or number of bits to reduce the memory footprint, increase the computing speed and lower the system power. This means that when executing operations like multiplication, dot-product, vector-by-matrix multiplication, matrix-by-matrix multiplication, or any other operation which can be expressed with similar operations, if the inputs are represented for example with N bits, outputs should also be represented by the same number of bits, i.e. N bits. This would guarantee that similar operation can be applied directly to the result of the previous computation in the next step.

However, most of the time when performing computations like multiplication on N-bit data, the result may require a greater number of bits to be expressed accurately. Reducing the output precision to N bits may require throwing away some of the Least Significant Bits (LSB) from the multiplication results. Computing these unwanted LSB bits can waste lots of computing resources and power while slowing down the digital system.

To lower the required computing resources and the power consumed to accomplish the computation and maximize the system throughput, precision at which input data is expressed may be reduced. For example, precision at which input data is expressed may be reduced from 8 bits to 4 bits or lower, but this may remarkably lower the precision of computation and therefore degrade the overall performance of the digital system.

This disclosure provides a computing methodology in digital systems that, instead of lowering the precision of input data or just throwing away the LSB bits of the result, analytically and intellectually recognizes unimportant internal computations which may mainly affect the eventually discarded LSB bits.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

In one embodiment, a method for reducing power consumed in processing units used to calculate computationally expensive operations is provided. The method may include receiving a dot-product computation to be calculated at a specified number of bits and breaking down the dot-product computation into a plurality of intermediate operations having 1-bit or 2-bit element input vectors. The method may also include assigning a gain value to each intermediate operation in the plurality of intermediate operations. The gain value assigned to each intermediate operation may be based on an analysis of the 1-bit or 2-bit element input vectors. The method may further include determining a threshold gain value and reducing the calculation precision for the intermediate operations that do not meet or exceed the threshold gain value.

In some embodiments, the threshold gain value is based on the number of bits at which the dot-product computation is to be calculated.

In some embodiments, the threshold gain value is based on a number of bits at which the elements of the input vectors are represented.

In some embodiments, the threshold gain value is based on a required precision output of the input vectors in the intermediate operations.

In some embodiments, a simple logic AND gate is used to calculate the intermediate operations having 1-bit element vectors.

In some embodiments, a single hardware is used to implement all of the intermediate operations.

In some embodiments, multiple modules are used in parallel to implement the intermediate operations.

In some embodiments, intermediate operations that do not meet or exceed the threshold gain value are removed from the dot-product computation. intermediate operations that do not meet or exceed the threshold gain value are either removed from the dot-product computation or calculated at lower precision.

In some embodiments, multiplications between 2-bit elements of input vectors are performed by using adder/subtractor and shifter without using multiplication.

In some embodiments, intermediate operations that do not meet or exceed the threshold gain value are calculated approximately at lower precision.

In another embodiment, an accelerator architecture system is disclosed. The accelerator architecture system may include a memory and a processor. The processor may be configured to receive a dot-product computation to be calculated at a specified number of bits and break down the dot-product computation into a plurality of intermediate operations having 1-bit or 2-bit element input vectors. The processor may also be configured to assign a gain value to each intermediate operation in the plurality of intermediate operations. The gain value assigned to each intermediate operation may be based on an analysis of the 1-bit or 2-bit element input vectors. The processor may also be configured to determine a threshold gain value and reduce the calculation precision for the intermediate operations that do not meet or exceed the threshold gain value.

In another embodiment a method for reducing power consumed in processing units used to calculate computationally expensive operations is disclosed. The method may include receiving a first input vector and a second input vector on which to perform a dot-product operation and using a scaling factor and a round(.) function to reduce the precision of the dot-product operation result. The scaling factor may be the maximum desired value of the dot-product operation result divided by the maximum possible value of the dot product for the precision at which it is calculated.

In some embodiments, the dot-product operation may be a convolution, a vector-by-matrix, or a matrix-by-matrix multiplication The object and advantages of the embodiments will be realized and achieved at least by the elements, features, and combinations particularly pointed out in the claims. Both the foregoing summary and the following detailed description are exemplary and are not restrictive of the invention as claimed.

BRIEF DESCRIPTION OF THE DRAWINGS

Example embodiments will be described and explained with additional specificity and detail through the use of the accompanying drawings in which.

DETAILED DESCRIPTION

This disclosure provides a computing methodology in digital systems that, instead of lowering the precision of input data or just throwing away the LSB bits of the result, analytically and intellectually recognizes unimportant internal computations which may mainly affect the eventually discarded LSB bits. By not executing these computations in the first place, computations may be performed faster at lower power consumptions. While this method of computation may impact the accuracy of the result (so the so-called approximate computing), the introduced degradation is both predictable and adjustable as needed. In addition, it introduces a method to perform a multiplication-based computation without using any multiplication operation and just by using addition operations and logical gates.

While the innovation introduced here may be applied to any similar computation, for the sake of simplicity and clarity, the focus herein is placed on the implementation of dot-product operation mainly because most other operations such as vector-by-matrix, matrix-by-matrix, tensor-by-tensor multiplications can be easily expressed as multiple dot product operations running in parallel.

One or more embodiments of the present disclosure may include a method or an accelerator architecture to reduce the power consumed in processing units like accelerators when used to calculate the computationally expensive operations, which may be expressed based on dot product. The accelerator may lower the amount of computation by performing internal computations at lower precisions or not implementing unimportant computations at all with minimum impact on the final result of the computation. The computing methodology may determine the importance of each internal computation and its impact on the result and decide whether to do the computation or not and with what precision.

Figure 1:
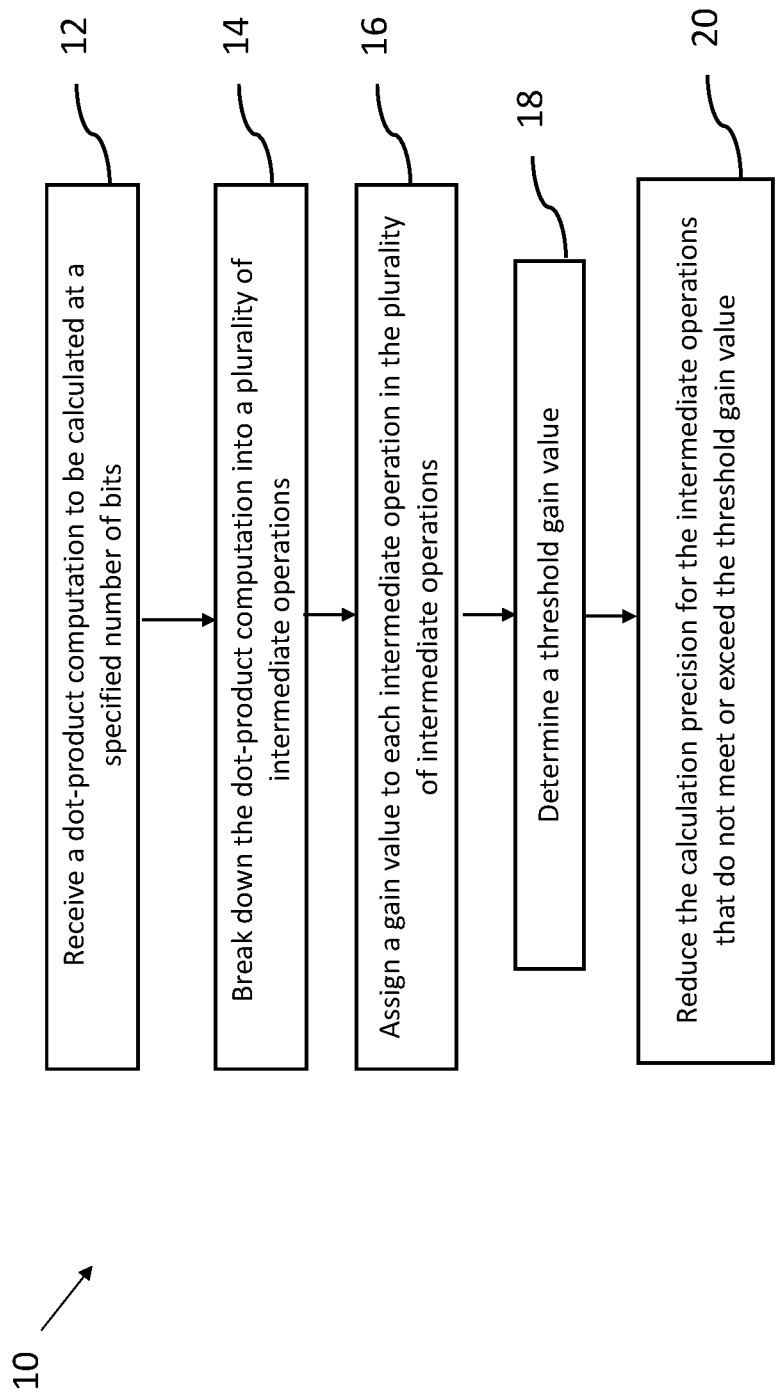
FIG. 1 illustrates an exemplary method for reducing power consumed in processing units used to calculate computationally expensive operations.

For example, FIG. 1 illustrates a method for reducing power consumed in processing units used to calculate computationally expensive operations 10. The method may include, at action 12, receiving a dot-product computation to be calculated at a specified number of bits. In some embodiments, the method may include, at action 14, breaking down the dot-product computation or any other computation which can be expressed based on dot-product computation into smaller dot-product computations, or "intermediate operations." For example, these intermediate operations may include dot-product computations having vectors with 1 or 2-bit elements. The method may include, at action 16, assigning a gain to each of these intermediate dot product operations determining their impact and importance on the final dot product result. Intermediate operations with low gain values may not have a large impact on the final dot product result and may be either removed from the computation or calculated with lower precision.

In some embodiments, the gain value assigned to each intermediate operation may be based, at least in part, on an analysis of the 1-bit or 2-bit element input vectors. The decision on which term to keep or discard may also consider a resolution of elements in the input vectors, their statistics, the required output precision, the number of elements in each vector, etc.

The gain of each intermediate dot product may depend on the precision (the number of bits) at which the dot product computation may be calculated. If the desired number of bits to represent the final dot product is much smaller than the maximum number of bits required to represent the dot product at maximum accuracy, more intermediate dot products may be removed from the calculation without affecting the output result. Avoiding unimportant computations may increase the speed and throughput of the digital system, while lowering its power consumption.

The method may include, at action 18, determining a threshold gain value. This threshold gain value may be compared to the gain values assigned to each intermediate operation. The method may include, at action 20, reducing the calculation precision for the intermediate operations that do not meet or exceed the threshold gain value. In some embodiments, intermediate operations that do not meet or exceed the threshold gain value may be calculated at a lower precision. In some embodiments, intermediate operations that do not meet or exceed the threshold gain value may be removed from the calculation altogether.

In some embodiments, the accelerator may use a single hardware to implement all the intermediate dot-products with low-precision elements or use multiple modules in parallel to accomplish the computations. Different terms or intermediate dot products may be added or removed from the computations on the fly depending on the desired output accuracy.

In other embodiments, the method of implementing dot product operations based on intermediate low-precision dot products may be used to avoid using costly multipliers when implementing computationally complex operations.

In some embodiments, a simple logic AND gate may be used to implement the multiplications between 1-bit elements.

In some embodiments, the processing system may operate on unsigned numbers while in other embodiments the system may perform dot product on vectors with elements represented as 2's complement or sign-magnitude.

In other embodiments, the approximate computing system may be used to implement computations of applications like deep neural networks and machine learning algorithms that can tolerate imprecise computations and errors at higher efficiencies minimizing the usage of resources and power.

One or more embodiments of the present disclosure may include a computing system. The computing system may consist of a specialized engine or accelerator to perform a dot product operation between two input vectors X and W, each with m elements and producing the scalar output Y. Elements of input vectors X and W may be represented by $N_x$ and $N_w$ bits respectively. When performing error-free computation, the maximum possible value of Y may be equal to 2 to the power of $N_x+N_w+\log 2(m)$ having $N_x+N_w+$ log 2(m) bits. The accelerator may reduce the output precision to $N_y$ bits where $N_y$ may be much smaller than $N_w+N_w+\log 2(m)$.

In some embodiments, the input vectors may be represented as binary numbers and the dot product operation may be expressed based on the base-2 numeral representations of vectors X and W like:

$$Y = X \cdot W$$

$$\begin{bmatrix}x_1\\x_2\\\vdots\\x_m\end{bmatrix} \cdot \begin{bmatrix}w_1\\w_2\\\vdots\\w_m\end{bmatrix} = \begin{bmatrix}(xb^1_{Nx-1},\ldots,xb^1_1,xb^1_0)_2\\(xb^2_{Nx-1},\ldots,xb^2_1,xb^2_0)_2\\\vdots\\(xb^m_{Nx-1},\ldots,xb^m_1,xb^m_0)_2\end{bmatrix} \cdot \begin{bmatrix}(wb^1_{Nx-1},\ldots,wb^1_1,wb^1_0)_2\\(wb^2_{Nx-1},\ldots,wb^2_1,wb^2_0)_2\\\vdots\\(wb^m_{Nx-1},\ldots,wb^m_1,wb^m_0)_2\end{bmatrix} =$$

$$\left(2^{Nx-1}\begin{bmatrix}xb^1_{Nx-1}\\xb^2_{Nx-1}\\\vdots\\xb^m_{Nx-1}\end{bmatrix} + \ldots + 2^1\begin{bmatrix}xb^1_1\\xb^2_1\\\vdots\\xb^m_1\end{bmatrix} + 2^0\begin{bmatrix}xb^1_0\\xb^2_0\\\vdots\\xb^m_0\end{bmatrix}\right) \cdot$$

$$\left(2^{Nw-1}\begin{bmatrix}wb^1_{Nw-1}\\wb^2_{Nw-1}\\\vdots\\wb^m_{Nw-1}\end{bmatrix} + \ldots + 2^1\begin{bmatrix}wb^1_1\\wb^2_1\\\vdots\\wb^m_1\end{bmatrix} + 2^0\begin{bmatrix}wb^1_0\\wb^2_0\\\vdots\\wb^m_0\end{bmatrix}\right)$$

Where Y may have at most $N_x+N_w+\log 2(m)$ bits in its binary representation. The computation may further be simplified as:

$$Y = \sum_{i=0}^{Nx-1}\sum_{j=0}^{Nw-1} 2^{i+j} \overbrace{\begin{bmatrix}xb^1_i\\xb^2_i\\\vdots\\xb^m_i\end{bmatrix} \cdot \begin{bmatrix}wb^1_j\\wb^2_j\\\vdots\\wb^m_j\end{bmatrix}}^{A} =$$

$$\sum_{i=0}^{Nx-1}\sum_{j=0}^{Nw-1}\sum_{k=1}^{m} 2^{i+j} xb^k_i \cdot wb^k_j = \sum_{i=0}^{Nx-1}\sum_{j=0}^{Nw-1}\sum_{k=1}^{m} 2^{i+j} \overbrace{\text{AND}\left(xb^k_i, wb^k_j\right)}^{B}$$

Where $xb_i^k$ is the ith bits in the binary representation of the kth element of vector X, $wb_j^k$ is the jth bits in the binary representation of the kth element of vector W, and AND is the logical AND function.

In some embodiments, the precision of dot product result Y may be reduced from $N_x+N_w+\log 2(m)$ to $N_y$ using a scaling factor and a round(.) function as:

$$Y_{Ny} = \text{round}\left(\frac{2^{Ny}}{2^{Nx+Nw+log2(m)}} \times Y_{Nx+Nw+log2(m)}\right) =$$

$$\text{round}\left(\sum_{i=0}^{Nx-1}\sum_{j=0}^{Nw-1}\frac{2^{Ny+i+j}}{2^{Nx+Nw+log2(m)}}\overbrace{\begin{bmatrix}xb^1_i\\xb^2_i\\\vdots\\xb^m_i\end{bmatrix} \cdot \begin{bmatrix}wb^1_j\\wb^2_j\\\vdots\\wb^m_j\end{bmatrix}}^{A_{ij}}\right)^{C_{ij}} =$$

$$\text{round}\left(\sum_{i=0}^{Nx-1}\sum_{j=0}^{Nw-1}\sum_{k=1}^{m}\frac{2^{Ny+i+j}}{2^{Nx+Nw+log2(m)}}\overline{\text{AND}\left(xb^k_i, wb^k_j\right)}^{B_{ij}}\right)$$

$$\frac{2^{Ny}}{2^{Nx+Nw+log2(m)}}, 2^{Ny}$$

Where in the scaling factor is the maximum value of output Y and $2^{Nx+Nw+log2(m)}$ is the maximum value of the result of the dot product.

Since the maximum value of term $A_{ij}$ in the above equation may be equal to $2^{log2(m)}$, the maximum amplitude of the term $C_{ij}$ may be equal to $$G_{ij} = \frac{2^{Ny+i+j}}{2^{Nx+Nw}} = 2^{Ny-(Nx+Nw)+i+j},$$

showing the importance of each $A_{ij}$ term in a given dot product computations. The higher the value of $G_{ij}$, the higher the importance of the term $A_{ij}$ in the result of the dot product calculation.

In some embodiments, the dot product between vectors X and W may be calculated approximately by just calculating (or implementing) the first L elements of $C_{ij}$ terms out of all $N_x*N_y$ terms which has the highest $G_{ij}$. Calculating more $C_{ij}$ terms with the highest G u s may improve the accuracy of the dot product result with the cost of performing more calculations and therefore burning more power in the underlying accelerator. On the other hand, less circuits with less power consumptions may be needed if a smaller number of $C_{ij}$ are calculated with the drawback of having less accurate dot product result.

The maximum amount of error in the dot product result calculated approximately may be equal to the sum of the $G_{ij}$ terms not included in the calculation of the dot product. The exact amount of error may depend on the exact values of the vectors and may be equal to the sum of the $C_{ij}$ values not included in the calculation of the dot product.

Any circuit with any configuration may be used to perform the calculations of $A_{ij}$ or $C_{ij}$. Unimportant $A_{ij}$ or $C_{ij}$ terms with small $G_{ij}$ may be calculated imprecisely using imprecise digital circuits. Circuits used to calculate important $C_{ij}$ terms may also be configured to perform the calculations imprecisely.

The dot product $A_{ij}$ happening between two 1-bit vectors may be implemented based on $B_{ij}$ which may be implemented using the digital AND gates.

In some embodiments, the dot product may be calculated at any given precision based on the terms $A_{ij}$, $C_{ij}$ or $B_{ij}$ to reach the minimum hardware while all the redundant internal computations have been avoided. The hardware may be implemented using just logic AND gate and adders.

In some accelerators, all $C_{ij}$ terms may be implemented in the hardware and they may be turned on and off to change the precision of computation on the fly depending on the required accuracy and desired system power consumption.

In some embodiments, there may be a single hardware inside the accelerator implementing all the $A_{ij}$, $C_{ij}$ or $B_{ij}$ computations. In some other embodiments, multiple hardware may be working together executing these computations in parallel.

In some embodiments, the same procedure may be repeated by breaking input binary vectors into vectors of binary numbers where this time each element of the vector has 2 bits instead of one like:

$$Y = \left(2^{Nx-2}\begin{bmatrix}(xb^1_{Nx-1}, xb^1_{Nx-2})\\(xb^2_{Nx-1}, xb^2_{Nx-2})\\\vdots\\(xb^m_{Nx-1}, xb^m_{Nx-2})\end{bmatrix} + \ldots + 2^0\begin{bmatrix}(xb^1_1, xb^1_0)\\(xb^2_1, xb^2_0)\\\vdots\\(xb^m_1, xb^m_0)\end{bmatrix}\right).$$

$$\left(2^{Nw-2}\begin{bmatrix}(wb^1_{Nw-1}, wb^1_{Nw-2})\\(wb^2_{Nw-1}, wb^2_{Nw-2})\\\vdots\\(wb^m_{Nw-1}, wb^m_{Nw-2})\end{bmatrix} + \ldots + 2^0\begin{bmatrix}(wb^1_1, wb^1_0)\\(wb^2_1, wb^2_0)\\\vdots\\(wb^m_1, wb^m_0)\end{bmatrix}\right)$$

$$Y = \sum_{i=0}^{Nx-2}\sum_{j=0}^{Nw-2} 2^{i+j} \begin{bmatrix}(xb^1_{i+1}, xb^1_i)_2\\(xb^2_{i+1}, xb^2_i)_2\\\vdots\\(xb^m_{i+1}, xb^m_i)_2\end{bmatrix} \cdot \begin{bmatrix}(wb^1_{j+1}, wb^1_j)_2\\(wb^2_{j+1}, wb^2_j)_2\\\vdots\\(wb^m_{j+1}, wb^m_j)_2\end{bmatrix}$$

This may reduce the dot product operation between the two original vectors X and W into the dot-product operations between multiple vectors with 2-bit elements (operation PO. Similar to other embodiments, when computing output Y at $N_y$-bit precision, unimportant $P_{ij}$ terms may be removed from the computation or be computed at lower precision to calculate the approximated output while having more efficient hardware implementation. Moreover, calculation of dot product between vectors with 2-bit elements may be faster and more efficient since they may be implemented without using any multiplication operation and just with adders/subtractors and shifters.

In some embodiments, the elements of input vectors X and W may be represented as 2's complement. In this case, based on the binary representations of these 2's complement elements, the dot product output Y may be written as:

$$Y = \left(-2^{Nx-1}\begin{bmatrix}xb^1_{Nx-1}\\xb^2_{Nx-1}\\\vdots\\xb^m_{Nx-1}\end{bmatrix} + \ldots + 2^1\begin{bmatrix}xb^1_1\\xb^2_1\\\vdots\\xb^m_1\end{bmatrix} + 2^0\begin{bmatrix}xb^1_0\\xb^2_0\\\vdots\\xb^m_0\end{bmatrix}\right).$$

$$\left(-2^{Nw-1}\begin{bmatrix}wb^1_{Nw-1}\\wb^2_{Nw-1}\\\vdots\\wb^m_{Nw-1}\end{bmatrix} + \ldots + 2^1\begin{bmatrix}wb^1_1\\wb^2_1\\\vdots\\wb^m_1\end{bmatrix} + 2^0\begin{bmatrix}wb^1_0\\wb^2_0\\\vdots\\wb^m_0\end{bmatrix}\right)$$

Which may be written as:

$$Y = 2^{Nx+Nw-2}\overbrace{\begin{bmatrix}xb^1_{Nx-1}\\xb^2_{Nx-1}\\\vdots\\xb^m_{Nx-1}\end{bmatrix}\cdot\begin{bmatrix}wb^1_{Ny-1}\\wb^2_{Ny-1}\\\vdots\\wb^m_{Ny-1}\end{bmatrix}}^{D} - \sum_{j=0}^{Nw-2} 2^{Nx+j-1}\overbrace{\begin{bmatrix}xb^1_{Nx-1}\\xb^2_{Nx-1}\\\vdots\\xb^m_{Nx-1}\end{bmatrix}\cdot\begin{bmatrix}wb^1_j\\wb^2_j\\\vdots\\wb^m_j\end{bmatrix}}^{E_i} - \sum_{i=0}^{Nx-2} 2^{Nw+i-1}\overbrace{\begin{bmatrix}xb^1_i\\xb^2_i\\\vdots\\xb^m_i\end{bmatrix}\cdot\begin{bmatrix}wb^1_{Nw-1}\\wb^2_{Nw-1}\\\vdots\\wb^m_{Nw-1}\end{bmatrix}}^{F_j} + \sum_{i=0}^{Nx-2}\sum_{j=0}^{Nw-2} 2^{i+j}\overbrace{\begin{bmatrix}xb^1_i\\xb^2_i\\\vdots\\xb^m_i\end{bmatrix}\cdot\begin{bmatrix}wb^1_j\\wb^2_j\\\vdots\\wb^m_j\end{bmatrix}}^{H_{ij}}$$

Its precision can be reduced to $N_y$ bits as:

$$y_{Ny} = \text{round }(\overbrace{\frac{2^{Nx-Nw-2}}{2^{Nx+Nw+\log 2(m)}}\begin{bmatrix}xb^1_{Nx-1}\\xb^2_{Nx-1}\\\vdots\\xb^m_{Nx-1}\end{bmatrix}\cdot\begin{bmatrix}wb^1_{Ny-1}\\wb^2_{Ny-1}\\\vdots\\wb^m_{Ny-1}\end{bmatrix}}^{D} -$$

$$\sum_{j=0}^{Nw-2}\overbrace{\frac{2^{Nx+j-1}}{2^{Nx+Nw+\log 2(m)}}\begin{bmatrix}xb^1_{Nx-1}\\xb^2_{Nx-1}\\\vdots\\xb^m_{Nx-1}\end{bmatrix}\cdot\begin{bmatrix}wb^1_j\\wb^2_j\\\vdots\\wb^m_j\end{bmatrix}}^{E_i} -$$

$$\sum_{i=0}^{Nx-2}\overbrace{\frac{2^{Nw+i-1}}{2^{Nx+Nw+\log 2(m)}}\begin{bmatrix}xb^1_i\\xb^2_i\\\vdots\\xb^m_i\end{bmatrix}\cdot\begin{bmatrix}wb^1_{Nw-1}\\wb^2_{Nw-1}\\\vdots\\wb^m_{Nw-1}\end{bmatrix}}^{F_j} +$$

$$\sum_{i=0}^{Nx-2}\sum_{j=0}^{Nw-2}\overbrace{\frac{2^{i+j}}{2^{Nx+Nw+\log 2(m)}}\begin{bmatrix}xb^1_i\\xb^2_i\\\vdots\\xb^m_i\end{bmatrix}\cdot\begin{bmatrix}wb^1_j\\wb^2_j\\\vdots\\wb^m_j\end{bmatrix}}^{H_{ij}}$$

In some embodiments, the dot product between two vectors X and W with elements represented as 2's complement may be implemented approximately by just calculating those F) and/or $H_{ij}$ elements which has the highest impacts on the dot product results. More or less elements may be included in the computation to reach higher or lower precision respectively. The exact number of terms included in the computation may depend on the required precision, existing resources on the hardware, power budget and the distribution of signals X and W.

The importance of each $E_i$ element may be equal to $$\frac{2^{Nx+j-1}}{2^{Nx+NW}},$$

the importance of element $F_j$ may be equal to $$\frac{2^{Nw+i-1}}{2^{Nx+Nw}},$$

and the importance of each $H_{ij}$ element may be equal to $$\frac{2^{i+j}}{2^{Nx+Nw}}$$

on the final dot product result. Different numbers of elements may be removed from $E_j$, $F_j$, or $H_{ij}$ to reduce the amount of computation required for the calculation of the dot product without a remarkable impact on the result accuracy.

The error on the calculated dot product may be computed by adding up the omitted terms per each given set of input signals.

Each term of D, $E_i$, $F_j$, $H_{ij}$ themselves may be calculated with imprecise hardware at lower precisions or may be calculated precisely. These terms may also be implemented using the AND gates similar to the computations performed for dot product between unsigned vectors.

The term D may be calculated at its highest precision since it does computation on MSB bits of vectors X and W.

Any other operation which can be expressed as a set of dot product operations may be implemented approximately using the method explained in these embodiments.

Operations like convolution, vector-by-matrix, or matrix-by-matrix multiplication in applications like deep neural networks and machine learning algorithms which can tolerate imprecise computations can be expressed as dot products and implemented approximately as explained in this disclosure.

Deciding which terms to include in the computation and which terms to omit may depend on the statistics of the data in the X and W vectors and the precision (number of bits) at which these vectors are represented at. For example, if X elements has 4 bits and W elements has 8 bits, it may be better to omit only those terms which do computations on LSB bits of the signal W which has been represented with a higher number of bits.

Figure 2:
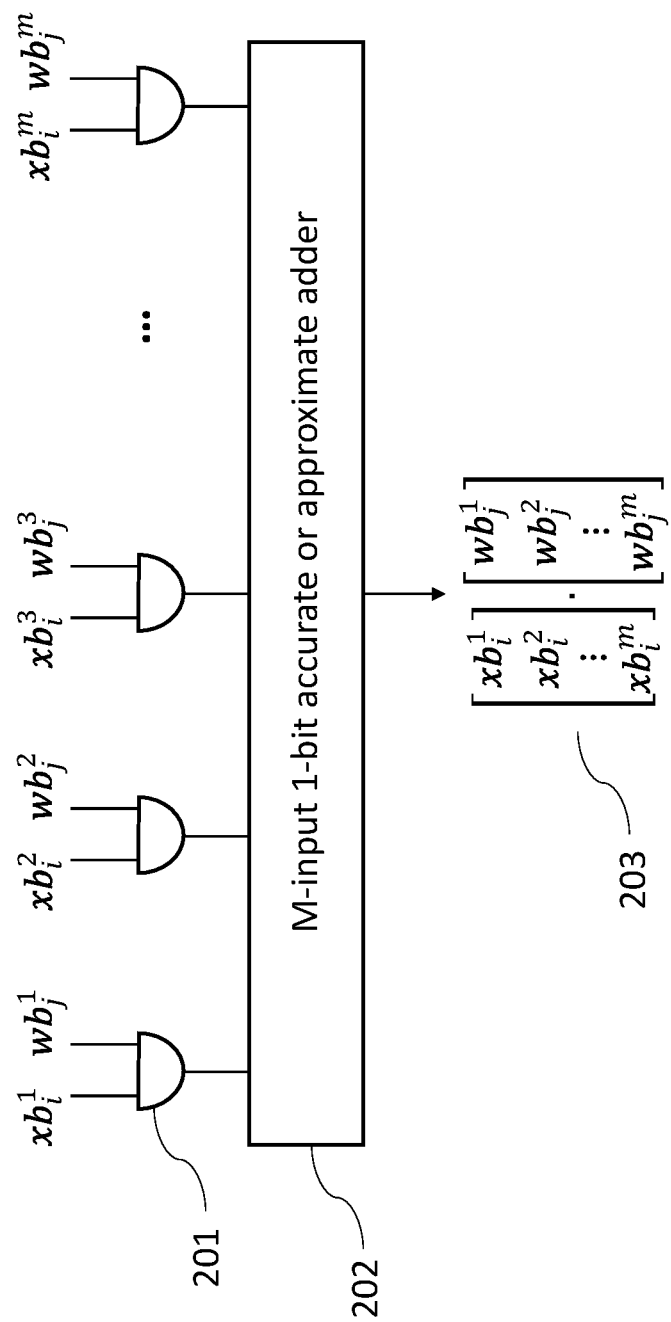
FIG. 2 illustrates an example of a system implementing a dot-product between two 1-bit vectors using logic AND gates and accurate or approximate adder.

FIG. 2 illustrates an example of a computing system and methodology for performing a dot product between two vectors X and W each with 1-bit elements. Element-wise multiplications between two single bit elements of x and w may be implemented using a logic AND gate 201. The results of multiplication which are also single bits may then be added together using an adder 202. The adder 202 may be an accurate adder producing the result 203 with log 2(m) bit precision or it may be an approximate adder calculating LSB bits of the summation results with less precision. In some other embodiments, the adder may not calculate the LSB bits of the summation results at all since they may be thrown away later when calculating the dot products between original multi-bit vectors.

Figure 3:
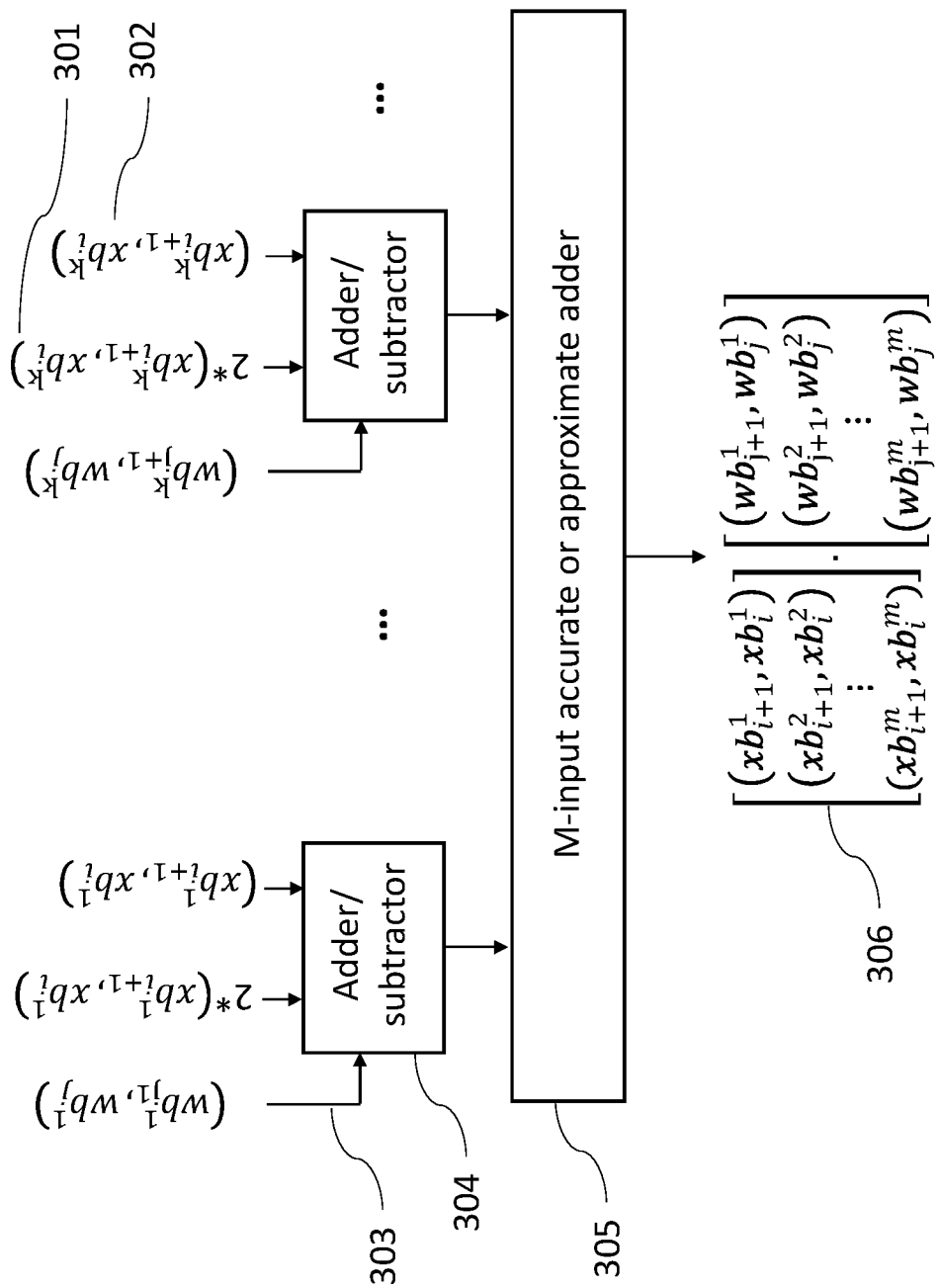
FIG. 3 illustrates an example of a system implementing a dot-product between two 2-bit vectors without using any multiplier.

FIG. 3 illustrates an example of a computing system and methodology for performing a dot product between two vectors X and W each with 2-bit elements without using any multiplication operation. Element-wise multiplications between two 2-bit numbers may be implemented by first generating two signals from one of the input elements, where one of the signals is the input itself 301 and the other one is twice the input element, 302, which can be implemented using shifters. Then both the signals may be given to the adder/subtractor module 304 where the other element 303 would determine how the two inputs 301 and 302 may be combined together to generate the result of multiplication between two input elements. The results of multiplication, which may then be added together using an adder 305. The adder 305 may be an accurate adder producing the result 306 with log 2(m)+4 bit precision or it may be an approximate adder calculating LSB bits of the summation results with less precision. In some other embodiments, the adder may not calculate the LSB bits of the summation results at all since they may be thrown away later when calculating the dot products between original multi-bit vectors at lower precision.

In some embodiments, multiple of modules shown in FIG. 2 an/or FIG. 3 may be implemented and work together to implement more complex computations like convolution or vector-by-matrix, matrix-by-matrix, or tensor-by-tensor multiplications.

In some embodiments, the approximate adder may be implemented by keeping the maximum number of bits the summation result may have fixed and smaller than the maximum number of bits the maximum summation result may have. Whenever the summation result becomes larger than what can be represented by the adder, only the MSBs of the result may be kept while LSB bits may be discarded.

In accordance with common practice, the various features illustrated in the drawings may not be drawn to scale. The illustrations presented in the present disclosure are not meant to be actual views of any particular apparatus (e.g., device, system, etc.) or method, but are merely example representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the summary, detailed description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

The foregoing description, for purpose of explanation, has been described with reference to specific embodiments. However, the illustrative discussions above are not intended to be exhaustive or to limit the invention as claimed to the precise forms disclosed. Many modifications and variations are possible in view of the above teachings. The embodiments were chosen and described to explain practical applications, to thereby enable others skilled in the art to utilize the invention as claimed and various embodiments with various modifications as may be suited to the particular use contemplated.

The invention claimed is:

1. A method for reducing power consumed in processing units used to calculate computationally expensive operations, the method comprising:
   receiving a dot-product computation to be calculated at a specified number of bits;
   breaking down the dot-product computation into a plurality of intermediate operations having 1-bit or 2-bit element input vectors;
   assigning a gain value to each intermediate operation in the plurality of intermediate operations, wherein the gain value assigned to each intermediate operation is based on an analysis of the 1-bit or 2-bit element input vectors;
   determining a threshold gain value; and
   reducing the calculation precision for the intermediate operations that do not meet or exceed the threshold gain value.

2. The method of claim 1, wherein the threshold gain value is based on the number of bits at which the dot-product computation is to be calculated.

3. The method of claim 1, wherein the threshold gain value is based on a number of elements in the input vectors in the intermediate operations.

4. The method of claim 1, wherein the threshold gain value is based on a number of bits at which the elements of the input vectors are represented.

5. The method of claim 1, wherein a simple logic AND gate is used to calculate the intermediate operations having 1-bit element vectors.

6. The method of claim 1, wherein a single hardware is used to implement all of the intermediate operations.

7. The method of claim 1, wherein multiple modules are used in parallel to implement the intermediate operations.

8. The method of claim 1, wherein intermediate operations that do not meet or exceed the threshold gain value are either removed from the dot-product computation or calculated at lower precision.

9. The method of claim 1, wherein multiplications between 2-bit elements of input vectors are performed by using adder/subtractor and shifter without using multiplication.

10. An accelerator architecture system comprising:
    a memory; and
    a processor coupled to the memory, the processor being configured to:
       receive a dot-product computation to be calculated at a specified number of bits;
       break down the dot-product computation into a plurality of intermediate operations having 1-bit or 2-bit element input vectors;
       assign a gain value to each intermediate operation in the plurality of intermediate operations, wherein the gain value assigned to each intermediate operation is based on an analysis of the 1-bit or 2-bit element input vectors;
       determine a threshold gain value; and
       reduce the calculation precision for the intermediate operations that do not meet or exceed the threshold gain value.

11. The system of claim 10, wherein the threshold gain value is based on the number of bits at which the dot-product computation is to be calculated.

12. The system of claim 10, wherein the threshold gain value is based on a number of elements in the input vectors in the intermediate operations.

13. The system of claim 10, wherein the threshold gain value is based on the number of bits at which the elements of the input vectors are represented.

14. The system of claim 10, wherein a simple logic AND gate is used to calculate the intermediate operations having 1-bit element vectors.

15. The system of claim 10, wherein a single hardware is used to implement all of the intermediate operations.

16. The system of claim 10, wherein multiple modules are used in parallel to implement the intermediate operations.

17. The system of claim 10, wherein intermediate operations that do not meet or exceed the threshold gain value are either removed from the dot-product computation or calculated at lower precision.

* * * * *